US012025143B2

(12) United States Patent
Chang et al.

(10) Patent No.: US 12,025,143 B2
(45) Date of Patent: Jul. 2, 2024

(54) MIXED FLOW FAN WITH ENHANCED HEAT DISSIPATION EFFICIENCY

(71) Applicant: DELTA ELECTRONICS, INC., Taoyuan (TW)

(72) Inventors: Shun-Chen Chang, Taoyuan (TW); Chao-Fu Yang, Taoyuan (TW); Chien-Hung Chen, Taoyuan (TW); Chien-Chih Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 236 days.

(21) Appl. No.: 17/569,125

(22) Filed: Jan. 5, 2022

(65) Prior Publication Data

US 2022/0128059 A1 Apr. 28, 2022

Related U.S. Application Data

(63) Continuation of application No. 16/241,516, filed on Jan. 7, 2019, now abandoned.

(30) Foreign Application Priority Data

Jun. 25, 2018 (CN) ........................ 201810664160.4

(51) Int. Cl.
*F04D 25/08* (2006.01)
*F04D 25/06* (2006.01)
(Continued)

(52) U.S. Cl.
CPC ....... *F04D 25/082* (2013.01); *F04D 25/0606* (2013.01); *F04D 29/329* (2013.01);
(Continued)

(58) Field of Classification Search
CPC .. F04D 25/082; F04D 25/0606; F04D 29/384; F04D 29/545; F04D 29/542;
(Continued)

(56) References Cited

U.S. PATENT DOCUMENTS 4,890,980 A 1/1990 Heald et al.
5,210,945 A 5/1993 Suzuki
(Continued)

FOREIGN PATENT DOCUMENTS

CN 1223027 A 7/1999
EP 2492515 A2 8/2012
(Continued)

OTHER PUBLICATIONS

Machine Translation of JP 2006077631 A to Sakai, retrieved from espacenet on Sep. 4, 2023 (Year: 2023).*

*Primary Examiner* — Philip E Stimpert
*Assistant Examiner* — Dnyanesh G Kasture
(74) *Attorney, Agent, or Firm* — Muncy, Geissler, Olds & Lowe, P.C.

(57) ABSTRACT

A fan includes a frame, an impeller and a motor. The impeller includes a hub, a plurality of blades, first air-guiding plates and second air-guiding plates. The hub has a tapered shape. A width of the hub gradually increases along a direction from a top portion of the hub to a bottom portion of the hub. The hub has at least an air vent. The blades are disposed around an outer periphery of the hub. The first air-guiding plates and the second air-guiding plates are disposed around an inner periphery of the hub. The first air-guiding plates are arranged between two of the second air-guiding plates in staggered. The second air-guiding plates are arranged between two of the first air-guiding plates in staggered. The first air-guiding plates and the second air-guiding plates have different thicknesses, heights or shapes.

12 Claims, 9 Drawing Sheets

(51) Int. Cl.
*F04D 29/32* (2006.01)
*F04D 29/38* (2006.01)
*F04D 29/54* (2006.01)

(52) U.S. Cl.
CPC ......... *F04D 29/384* (2013.01); *F04D 29/545* (2013.01); *F04D 29/542* (2013.01); *F05B 2240/14* (2013.01); *F05B 2240/301* (2013.01); *F05B 2260/20* (2013.01)

(58) Field of Classification Search
CPC .... F04D 25/08; F04D 29/403; F04D 29/5806; F04D 29/584; F04D 29/329; F04D 5/007; F04D 5/008; F04D 1/04; F04D 17/06; F04D 29/4273; F04D 29/38; F04D 29/26; F04D 29/327; F04D 29/582; F04D 29/666; F04D 25/06; F04D 25/064; F04D 29/58; F04D 25/5806; F04D 25/582; F05B 2240/301; F05B 2260/20; F05B 2240/14; H02K 9/06
See application file for complete search history.

(56) References Cited

U.S. PATENT DOCUMENTS

| | | | | | |
|---|---|---|---|---|---|
| 5,290,236 | A | | 3/1994 | Mathewson | |
| 5,814,908 | A | * | 9/1998 | Muszynski | F04D 29/5806 310/58 |
| 5,938,527 | A | * | 8/1999 | Oshima | F24F 1/01 454/344 |
| 6,189,556 | B1 | | 2/2001 | Blake et al. | |
| 7,541,702 | B2 | * | 6/2009 | Murakami | H02K 9/06 310/67 R |
| 8,029,251 | B2 | | 10/2011 | Oguma | |
| 9,556,884 | B2 | * | 1/2017 | Burman | F04D 29/542 |
| 10,396,701 | B2 | | 8/2019 | Hara et al. | |
| 2003/0039544 | A1 | | 2/2003 | Yamazaki | |
| 2003/0123975 | A1 | * | 7/2003 | Horng | F04D 29/666 415/220 |
| 2007/0152519 | A1 | * | 7/2007 | Jarrah | F04D 25/082 310/58 |
| 2008/0075596 | A1 | | 3/2008 | Kitamura | |
| 2008/0240921 | A1 | | 10/2008 | Chang et al. | |
| 2010/0059210 | A1 | * | 3/2010 | Li | F04D 29/38 416/203 |
| 2014/0294621 | A1 | | 10/2014 | Narita | |
| 2015/0044077 | A1 | | 2/2015 | Huang et al. | |
| 2019/0021562 | A1 | | 1/2019 | Shiozawa et al. | |
| 2022/0220971 | A1 | * | 7/2022 | Takeishi | F04D 25/06 |

FOREIGN PATENT DOCUMENTS

| | | | | | |
|---|---|---|---|---|---|
| JP | 2006077631 | A | * | 3/2006 | F04D 29/28 |
| WO | WO 2007120340 | A2 | * | 10/2007 | H02K 9/06 |
| WO | WO-2007120340 | A2 | | 10/2007 | |

* cited by examiner

MIXED FLOW FAN WITH ENHANCED HEAT DISSIPATION EFFICIENCY

CROSS REFERENCE TO RELATED APPLICATION

This application is a Continuation Application (CA) of an earlier filed, pending, application, having application Ser. No. 16/241,516 and filed on Jan. 7, 2019, which claims priority under 35 U.S.C. § 119(a) on Patent Application No(s). 201810664160.4, filed in People's Republic of China on Jun. 25, 2018, the entire contents of which are hereby incorporated by reference.

BACKGROUND OF THE INVENTION

Field of Invention

The present disclosure relates to a fan and, in particular, to a mixed flow fan with an enhanced heat dissipation efficiency inside the fan.

Related Art

As the increasing of the performance of electronic devices, a lot of waste heat can be generated during the operation of the electronic devices. If the generated heat cannot be brought away the electronic devices, the temperature of the electronic devices will increase, which may cause the damage of the internal components and decrease the performance and lifetime of the electronic device. A fan is generally used as the heat-dissipation device in the electronic device. Recently, a fan (a mixed flow fan) having blades and hub with two or more different diameters is disclosed. However, although the conventional mixed flow fan is benefit in the heat dissipation of electronic device, the selection of the motor in the fan is highly limited to the materials due to the geometrical shape thereof. If the high-power heat dissipation is required, the selection of silicon steel plates may result in more waste heat accumulated inside the fan. This will cause the overheating inside the fan and lead to the burning of circuit board or the sufficient decreasing of the fan operation performance, thereby affecting the heat dissipation efficiency and lifetime of the fan.

Therefore, it is desired to provide a mixed flow fan that has an enhanced heat dissipation efficiency itself, thereby preventing the overheating inside the fan, and thus extending the lifetime of the fan and maintaining the fan operation efficiency.

SUMMARY OF THE INVENTION

An objective of this disclosure is to provide a fan that has an enhanced heat dissipation efficiency itself, thereby extending the lifetime of the fan and maintaining the fan operation efficiency.

This disclosure provides a fan, which comprises a frame, an impeller and a motor. The impeller comprises a hub, a plurality of blades, and a plurality of air-guiding plates. The hub has a tapered shape. A width of the hub gradually increases along a direction from a top portion of the hub to a bottom portion of the hub, and the hub has at least an air vent. The blades are disposed around an outer periphery of the hub, and the air-guiding plates are disposed around an inner periphery of the hub. The motor is disposed in the frame and comprises a stator structure and a rotor structure. The motor connects to and rotates the impeller. The rotor structure comprises a shaft, a magnetic conductive housing, and a magnetic element. One end of the shaft connects to the magnetic conductive housing. The magnetic element is disposed around an inner periphery of the magnetic conductive housing and located corresponding to the stator structure. A top surface of the magnetic conductive housing has at least an opening.

In one embodiment, the air vent is disposed on the top portion of the hub.

In one embodiment, the air vent is disposed between the top portion of the hub and front edges of the blades contacting the outer periphery of the hub.

In one embodiment, a size of the air vent is greater than or equal to 3 mm, or an equivalent area of the entire air vent is greater than or equal to 7 $mm^2$.

In one embodiment, the frame comprises a base, and a distance between a top portion of the base and the bottom portion of the hub is greater than or equal to 1.0 mm.

In one embodiment, each air-guiding plate extends from the inner periphery of the hub to an axis of the hub.

In one embodiment, a ratio of a height of each air-guiding plate to a distance from the top portion of the hub to the bottom portion of the hub ranges from 0.3 to 1.2.

In one embodiment, a ratio of a length of each air-guiding plate to a diameter of the magnetic conductive housing ranges from 0.1 to 0.9.

In one embodiment, the length of each air-guiding plate is greater than or equal to 10 mm, and a distance between each air-guiding plate and an axis of the hub is greater than or equal to 4 mm.

In one embodiment, a thickness of each air-guiding plate is greater than or equal to 1.0 mm.

In one embodiment, each air-guiding plate has a rib shape or a wing shape.

In one embodiment, the air-guiding plates are arranged with equivalent interval angles.

In one embodiment, the air-guiding plates are arranged with inequivalent interval angles.

In one embodiment, the air-guiding plates have the same lengths, thicknesses, heights, or shapes.

In one embodiment, at least one of lengths, thicknesses, heights, or shapes of the air-guiding plates are different.

In one embodiment, the inner periphery of the frame is configured with an air-guiding curved surface disposed at an air inlet side of the fan.

As mentioned above, in the fan of this disclosure, the heat dissipation efficiency inside the fan can be enhanced by providing at least one air vent on the hub, disposing a plurality of air-guiding plates around the inner periphery of the hub, and configuring at least one opening at the top surface of the magnetic conductive housing. Compared with the conventional fan, the fan of this disclosure can enhance the heat dissipation efficiency itself, thereby extending the lifetime of the fan and maintaining the fan operation efficiency.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

A fan of this disclosure can enhance the heat dissipation efficiency itself, thereby extending the lifetime of the fan and maintaining the fan operation efficiency. The structure and features of fan of this disclosure will be described in the following embodiments.

FIGS. 1 to 4 are schematic diagrams showing a fan 1 according to an embodiment of this disclosure. Referring to FIGS. 1 to 4, the fan 1 comprises a frame 11, an impeller 12 and a motor 13. The inner periphery of the frame 11 is configured with an air-guiding curved surface 11*a* disposed at an air inlet side F of the fan 1 for increasing the total air inlet area and guiding the air flow. The fan 1 of this disclosure is, for example, a mixed flow fan, but this disclosure is not limited thereto.

Figure 1:
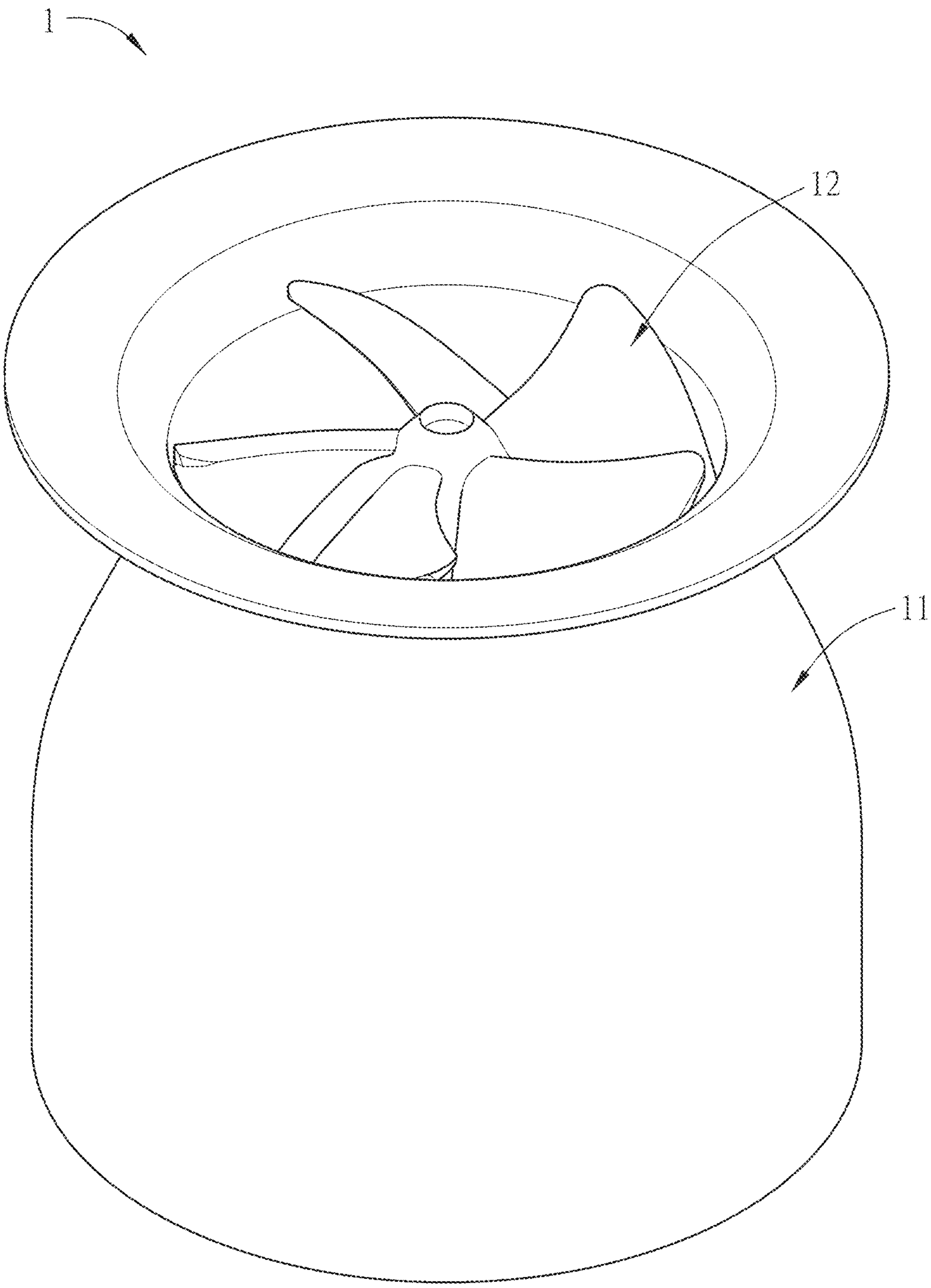
FIG. 1 is a schematic diagram showing a fan according to an embodiment of this disclosure.
Figure 2:
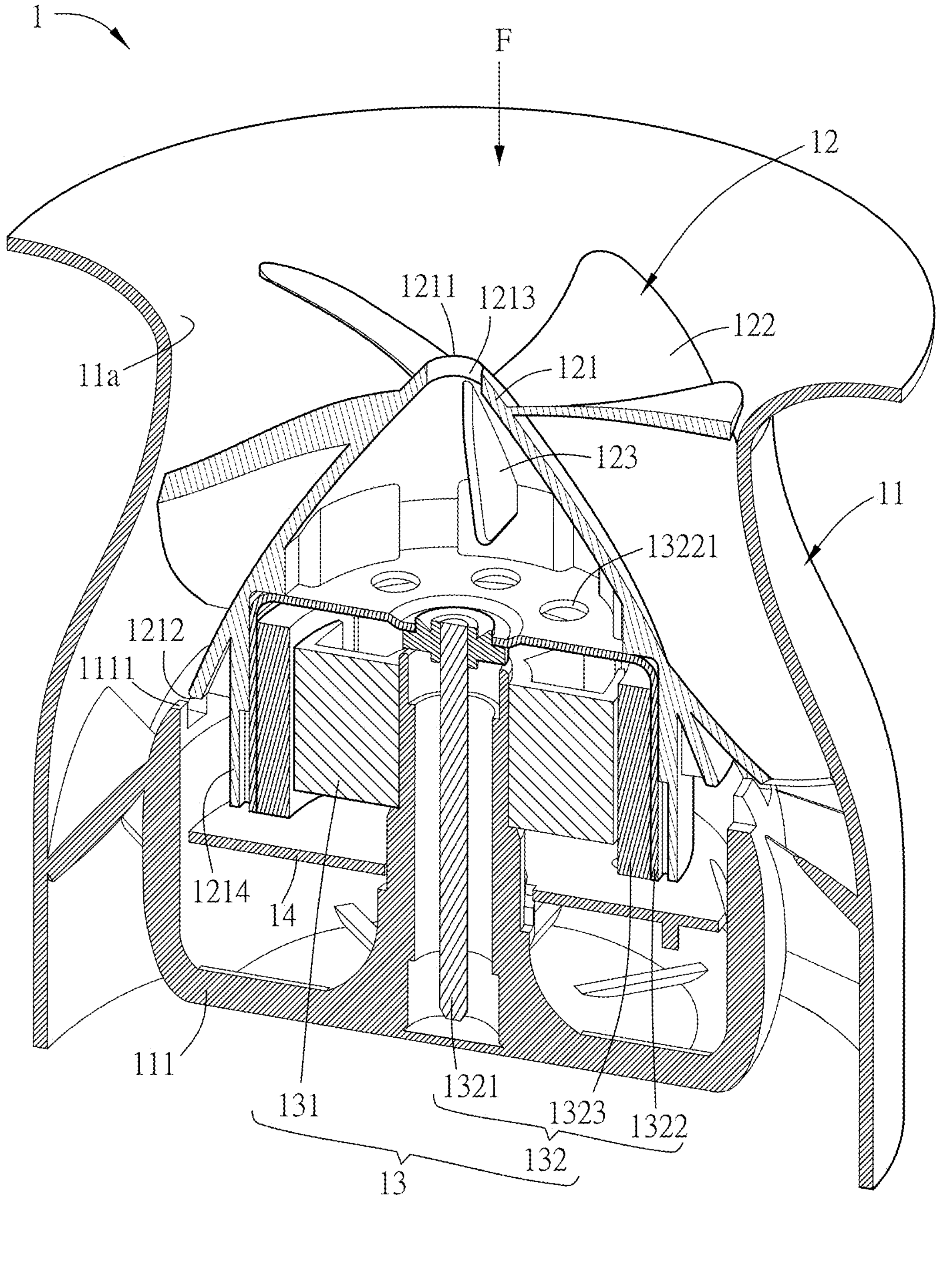
FIG. 2 is a sectional view of the fan of FIG. 1.
Figure 3:
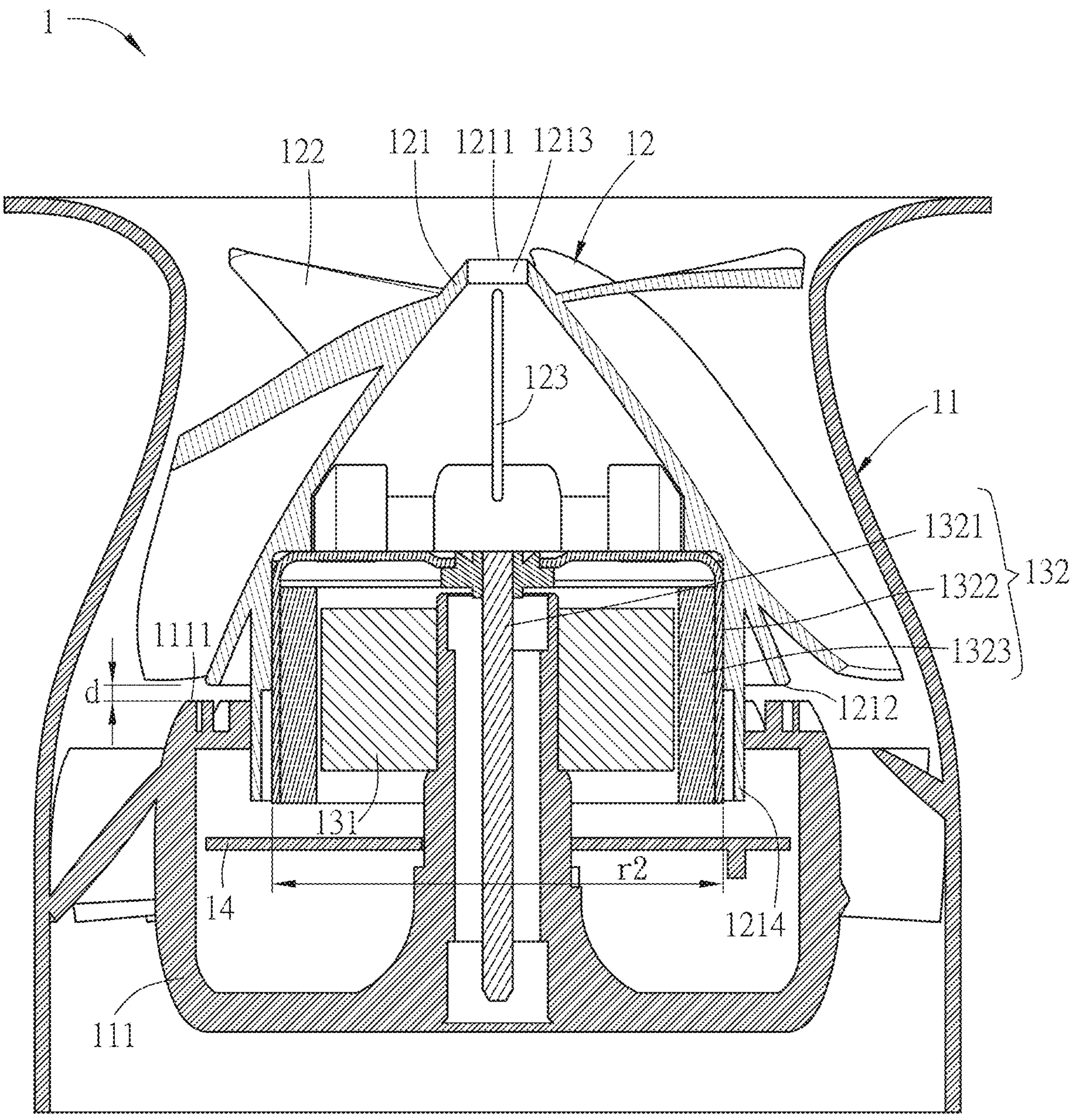
FIG. 3 is a side view of the fan of FIG. 2.
Figure 4:
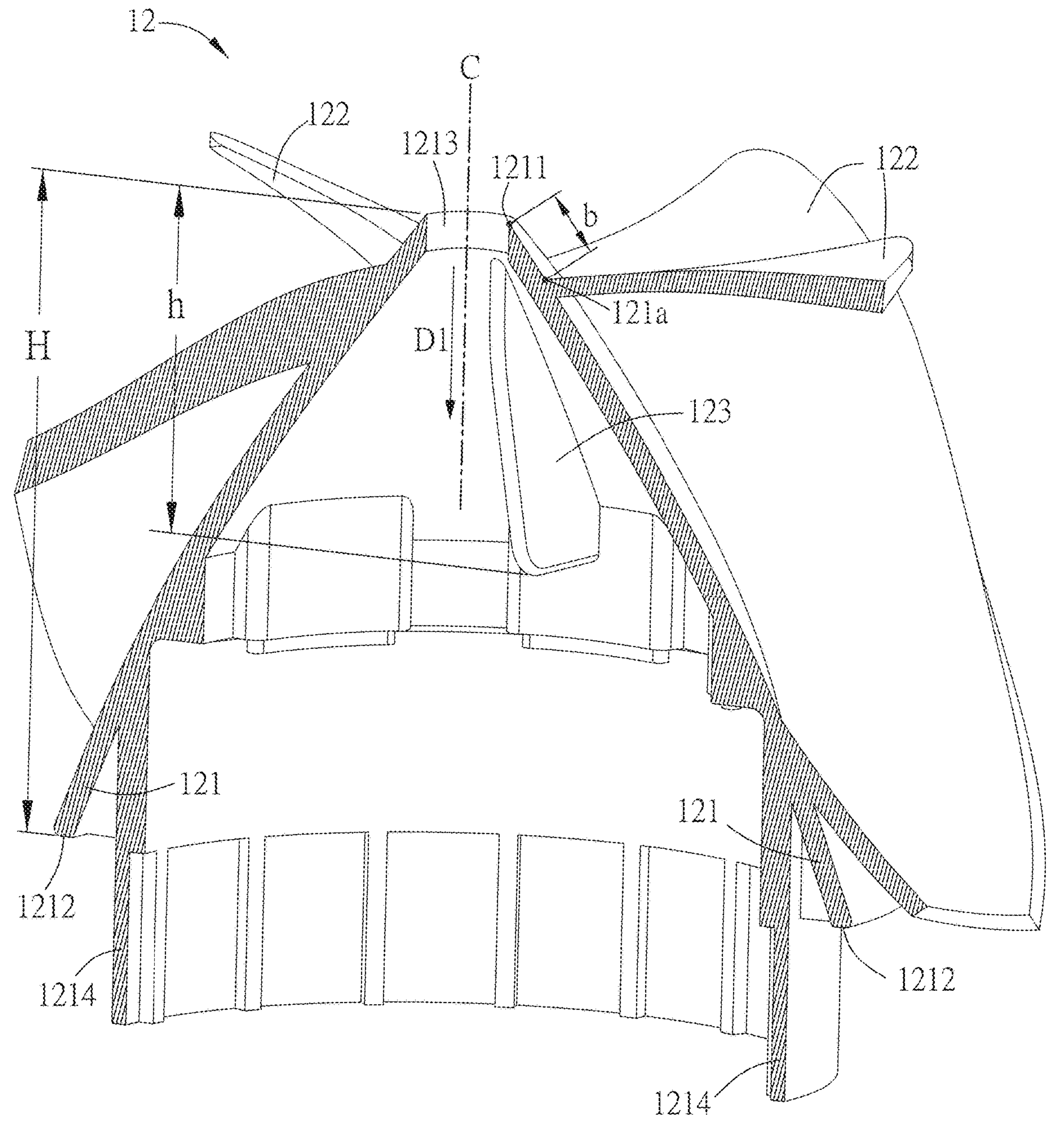
FIG. 4 is a schematic diagram showing the impeller of the fan of FIG. 2.

Referring to FIGS. 2 to 4, the impeller 12 comprises a hub 121, a plurality of blades 122, and a plurality of air-guiding plates 123. The hub 121 has a tapered shape. A width of the hub 121 gradually increases along a direction from a top portion 1211 of the hub 121 to a bottom portion 1212 of the hub 121, and the hub 121 has at least an air vent 1213. In this embodiment, the air vent 1213 is a through hole, so that the airflow can pass through the air vent 1213. The blades 122 are disposed around an outer periphery of the hub 121, and the air-guiding plates 123 are disposed around an inner periphery of the hub 121. In particular, as shown in FIGS. 2 to 4, the hub 121 has an extension portion 1214 protruding from the bottom portion 1212. To be noted, the extension portion 1214 of the hub 121 can also be evened with the bottom portion 1212 of the hub 121, and this disclosure is not limited thereto.

As shown in FIGS. 2 and 3, the motor 13 is disposed in the frame 11 and connects to and rotates the impeller 12. The motor 13 comprises a stator structure 131 and a rotor structure 132. The rotor structure 132 comprises a shaft 1321, a magnetic conductive housing 1322, and a magnetic element 1323. One end of the shaft 1321 connects to the magnetic conductive housing 1322. The magnetic element 1323 is disposed around an inner periphery of the magnetic conductive housing 1322 and located corresponding to the stator structure 131. A top surface of the magnetic conductive housing 1322 has at least an opening 13221. The opening 13221 is a through hole, so that the air flow can pass through the opening 13221. In particular, the end portion the shaft 1321 or the region close to the end portion of the shaft 1321 (the end portion protrudes from the magnetic conductive housing 1322, not shown) is connected to the magnetic conductive housing 1322. This disclosure is not limited thereto. In addition, the amount and shape of the opening 13221 can be modified based on the actual requirement of the user, and this disclosure is not limited. When the motor 13 rotates the impeller 12, the operation will generate waste heat accumulated inside the motor 13. The opening 13221 disposed on the top surface of the magnetic conductive housing 1322 allows the air to flow into the motor 13 for dissipating the waste heat, thereby enhancing the heat dissipation efficiency itself. In particular, the stator structure 131 of the motor 13 can be composed of silicon steel plates, coil, or other materials, and this disclosure is not limited. Moreover, FIGS. 2 and 3 show that the bottom portion of the magnetic conductive housing 1322 protrudes from the bottom portion 1212 of the hub 121. To be noted, the bottom portion of the magnetic conductive housing 1322 may even with the bottom portion 1212 of the hub 121 (not shown), and this disclosure is not limited thereto.

With Reference to FIGS. 2 and 3, the fan 1 further comprises a circuit board 14 electrically connected with the stator structure 131 for driving the stator structure 131.

In this embodiment, for example, the hub 121 comprises one air vent 1213. The air vent 1213 is disposed on the top portion 1211 of the hub 121, and the air vent 1213 faces toward the air inlet side F of the fan 1. Since the air vent 1213 is designed as a through hole, the air flow can pass through the air vent 1213 and reach inside the hub 121. Besides, the configuration of the air-guiding plates 123 can increase the air flowing inside the hub 121, thereby enhancing the heat dissipation efficiency itself. In particular, the amount and shape of the air vent 1213 can be modified based on the actual requirement of the user, and this disclosure is not limited.

In another embodiment, at least one air vent 1213 is disposed between the top portion 1211 of the hub 121 and the front edges 121*a* of the blades 122 contacting the outer periphery of the hub 121. For example, as shown in FIG. 4, the air vent 1213 can be disposed on any position within the region defined by the line b, which is between the top portion 1211 of the hub 121 and the front edges 121*a* of the blades 122 contacting the outer periphery of the hub 121. As mentioned above, when the air vent 1213 is disposed in front of the front edges 121*a* of the blades 122, it is benefit to guide the air flow into the hub 121. If the air vent 1213 is disposed at the position other than the above preferred region, the air flow may be guided to the air outlet directly after contacting the blades 122, and will not enter the hub 121.

Referring to FIGS. 2 and 3, in this embodiment, the frame 11 comprises a base 111, and a distance d (as shown in FIG. 3) between a top portion 1111 of the base 111 and the bottom portion 1212 of the hub 121 is greater than or equal to 1.0 mm. The configuration of the distance d can prevent the collision between the impeller 12 and the base 111 as well as the generated noise during the operation. In addition, the configuration of the distance d can also increase the exchange between the airflows inside and outside the impeller 12, so that the waste heat generated by the motor 13 can be dissipated to the outside. This can further enhance the heat dissipation efficiency of the fan 1 itself. As shown in FIGS. 2 and 3, the other end of the shaft 1321 can be connected to the base 111.

FIGS. 5A to 5D are schematic diagrams showing different impellers 12 according to different embodiments of this disclosure. Referring to FIGS. 4 and 5A to 5D, the size r1 of the air vent 1213 of the impeller 12 is greater than or equal to 3 mm, or an equivalent area of the entire air vent 1213 (the total area of the entire air vent 1213) is greater than or equal to 7 $mm^2$. The air vent 1213 is a through hole, and the airflow can pass through the air vent 1213. As shown in FIGS. 4 and 5A to 5D, for example, the impeller 12 comprises an air vent 1213, and the air vent 1213 is a circular hole disposed on the top portion 1211 of the hub 121. The size r1 is greater than or equal to 3 mm, which means the diameter r1 of the circular hole is greater than or equal to 3 mm. Alternatively, an equivalent area of the entire air vent 1213 is greater than or equal to 7 $mm^2$, which means the total area of the entire circular hole is greater than or equal to 7 $mm^2$. In particular, the amount and shape of the air vent 1213 can be modified based on the actual requirement of the user, and this disclosure is not limited. To be noted, the air vent 1213 can be disposed between the top portion 1211 of the hub 121 and the front edges 121*a* of the blades 122 contacting the outer periphery of the hub 121 (see FIG. 4), and this disclosure is not limited. For example, if the air vent 1213 is a rectangular hole, the size r1 is greater than or equal to 3 mm, which means the length r1 of the air vent 1213 is greater than or equal to 3 mm. Alternatively, an equivalent area of the entire air vent 1213 is greater than or equal to 7 $mm^2$, which means the total area of the entire air vent 1213 is greater than or equal to 7 $mm^2$. If the air vent 1213 has an irregular shape, the size r1 is greater than or equal to 3 mm, which means the diameter r1 of the average length r1 is greater than or equal to 3 mm. Alternatively, an equivalent area of the entire air vent 1213 is greater than or equal to 7 $mm^2$, which means the total area of the entire air vent 1213 is greater than or equal to 7 $mm^2$.

As shown in FIG. 4, a ratio of a height h of each air-guiding plate 123 to a distance H from the top portion 1211 of the hub 121 to the bottom portion 1212 of the hub 121 ranges from 0.3 to 1.2. In particular, although FIG. 4 shows that the air-guiding plates 123 are disposed along the direction D1 extending from the top portion 1211 of the hub 121 to the bottom portion 1212 of the hub 121, the configuration of the air-guiding plates 123 can also be adjusted according to the requirement of the user, and this disclosure is not limited. For example, the air-guiding plates 123 can be disposed along a horizontal line having an included angle with the direction D1 extending from the top portion 1211 of the hub 121 to the bottom portion 1212 of the hub 121.

The detailed configuration of the air-guiding plates 123 will be described hereinafter with reference to FIGS. 4 and 5A to 5D. Herein, the air-guiding plates 123 are disposed along the direction D2 extending from the inner periphery of the hub 121 to the axis c of the hub 121. That is, the direction D2 is perpendicular to the inner periphery of the hub 121. In particular, although FIG. 4 shows that the air-guiding plates 123 are disposed along the direction D2 perpendicular to the inner periphery of the hub 121 (the air-guiding plate 123 and the inner periphery of the hub 121 have an included angle of 90 degrees), the air-guiding plate 123 and the inner periphery of the hub 121 may have another included angle (e.g. 20 degrees, 45 degrees, or other degrees). The configuration of the included angle therebetween can be adjusted according to the requirement of the user, and this disclosure is not limited.

Figure 5A:
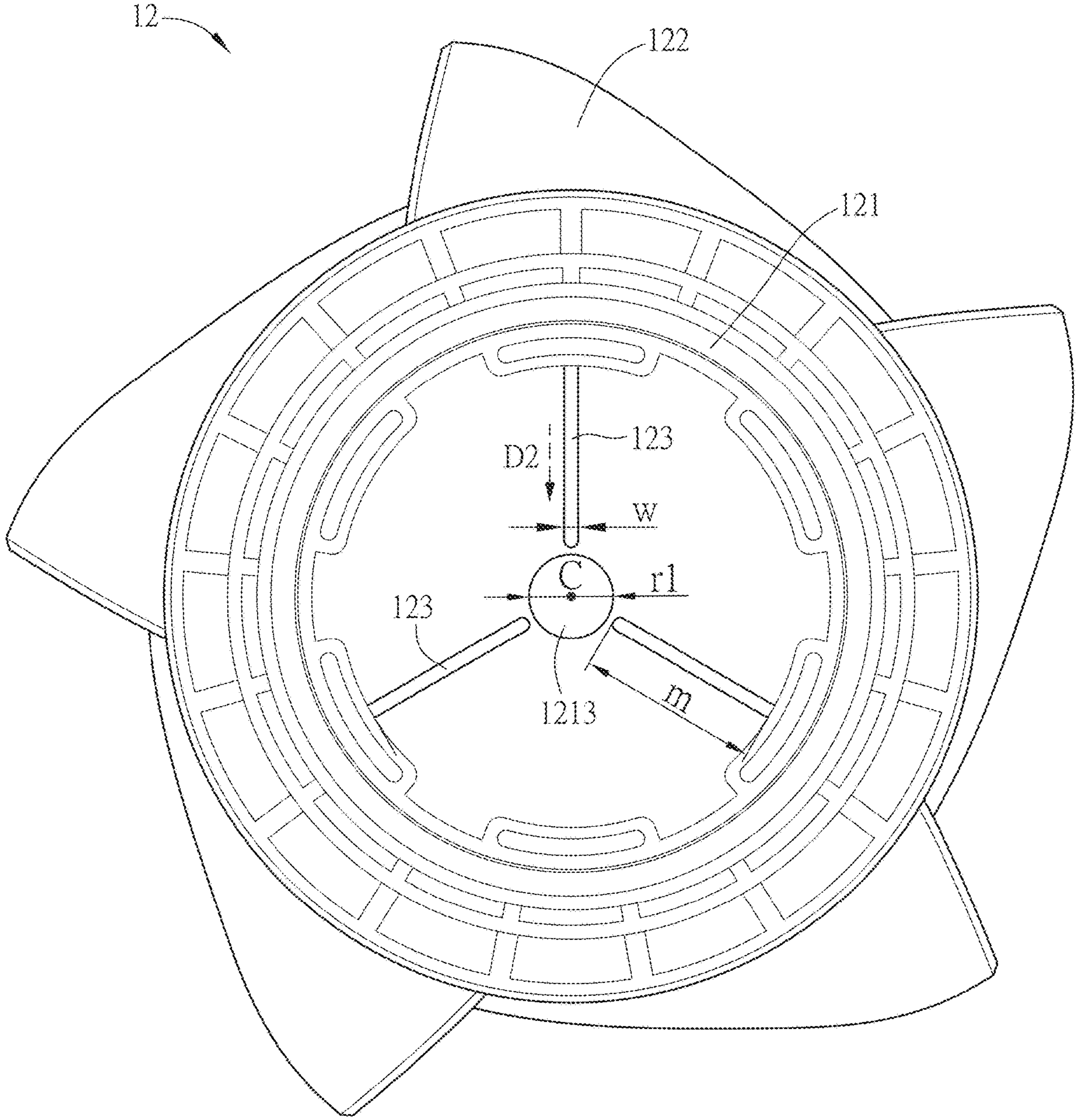
FIG. 5A is a schematic diagram showing an impeller of the fan according to an embodiment of this disclosure.

Referring to FIG. 5A in view of FIG. 3, in this embodiment, a ratio of the length m of each air-guiding plate 123 to the diameter r2 of the magnetic conductive housing 1322 ranges from 0.1 to 0.9.

Referring to FIG. 5A, in this embodiment, the length m of each air-guiding plate 123 is greater than or equal to 10 mm, and a distance between each air-guiding plate 123 and an axis c of the hub 121 is greater than or equal to 4 mm.

Referring to FIG. 5A, in this embodiment, a thickness w of each air-guiding plate 123 is greater than or equal to 1.0 mm.

Figure 5B:
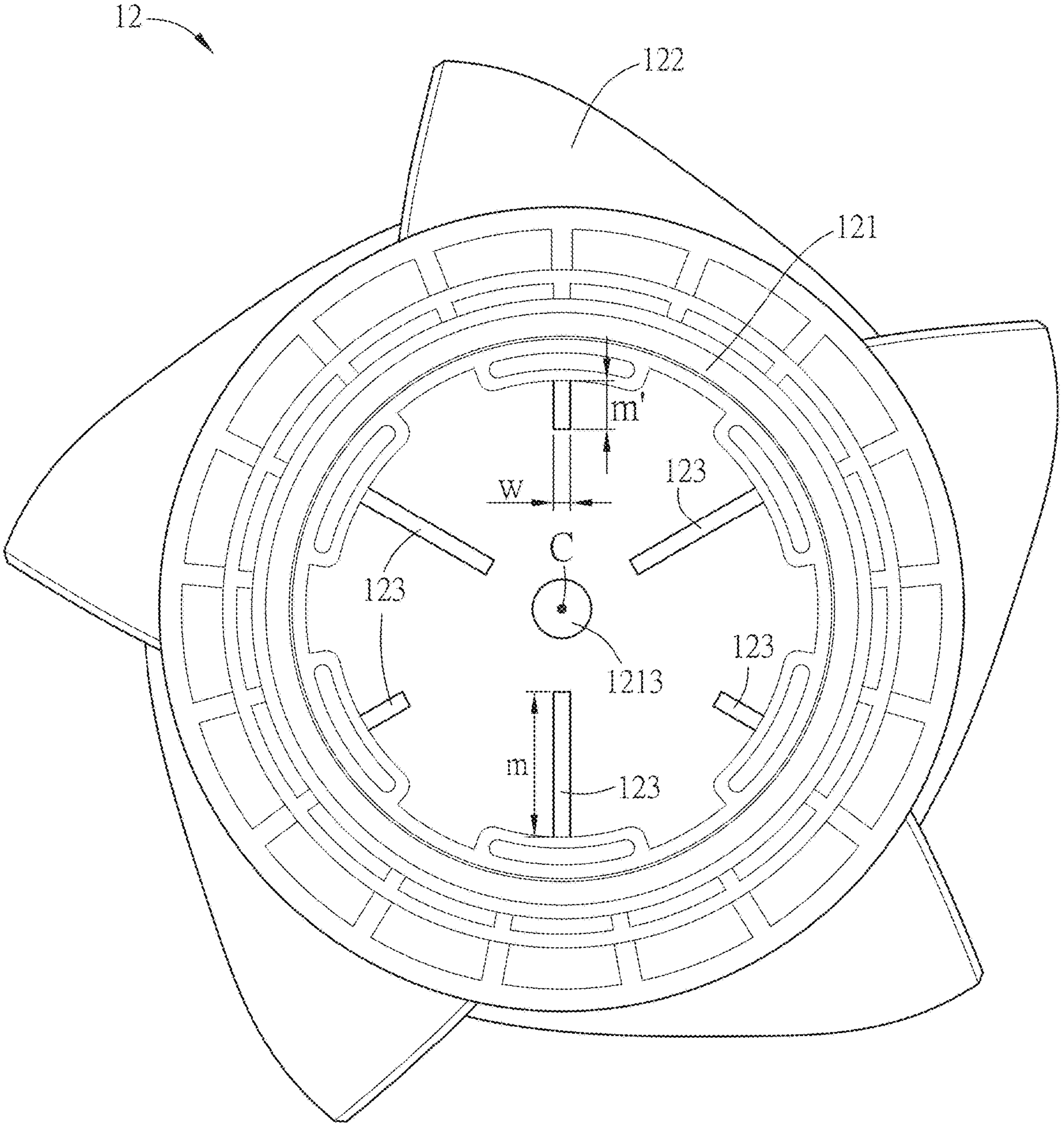
FIG. 5B is a schematic diagram showing another impeller of the fan according to another embodiment of this disclosure.
Figure 5C:
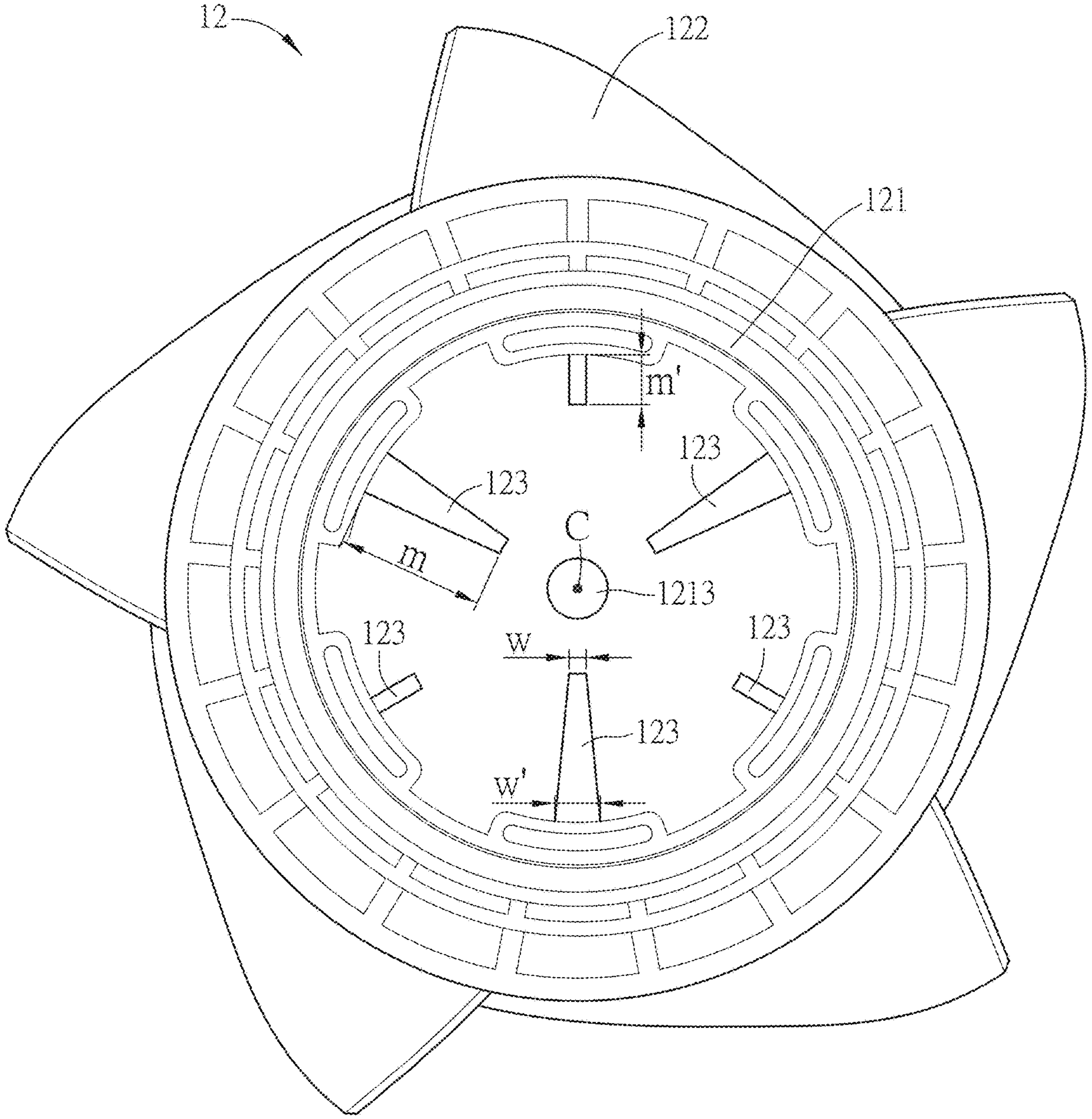
FIG. 5C is a schematic diagram showing another impeller of the fan according to another embodiment of this disclosure.

Referring to FIGS. 5A to 5C, each air-guiding plate 123 has a rib shape or a wing shape. In particular, as shown in FIGS. 5A to 5C, the air-guiding plate 123 has a rib shape. Of course, the air-guiding plate 123 may have a wing shape (not shown).

As shown in FIGS. 5A to 5C, the air-guiding plates 123 are arranged on the inner periphery of the hub 121 with equivalent interval angles. Alternatively, the air-guiding plates 123 are arranged on the inner periphery of the hub 121 with inequivalent interval angles.

Figure 5D:
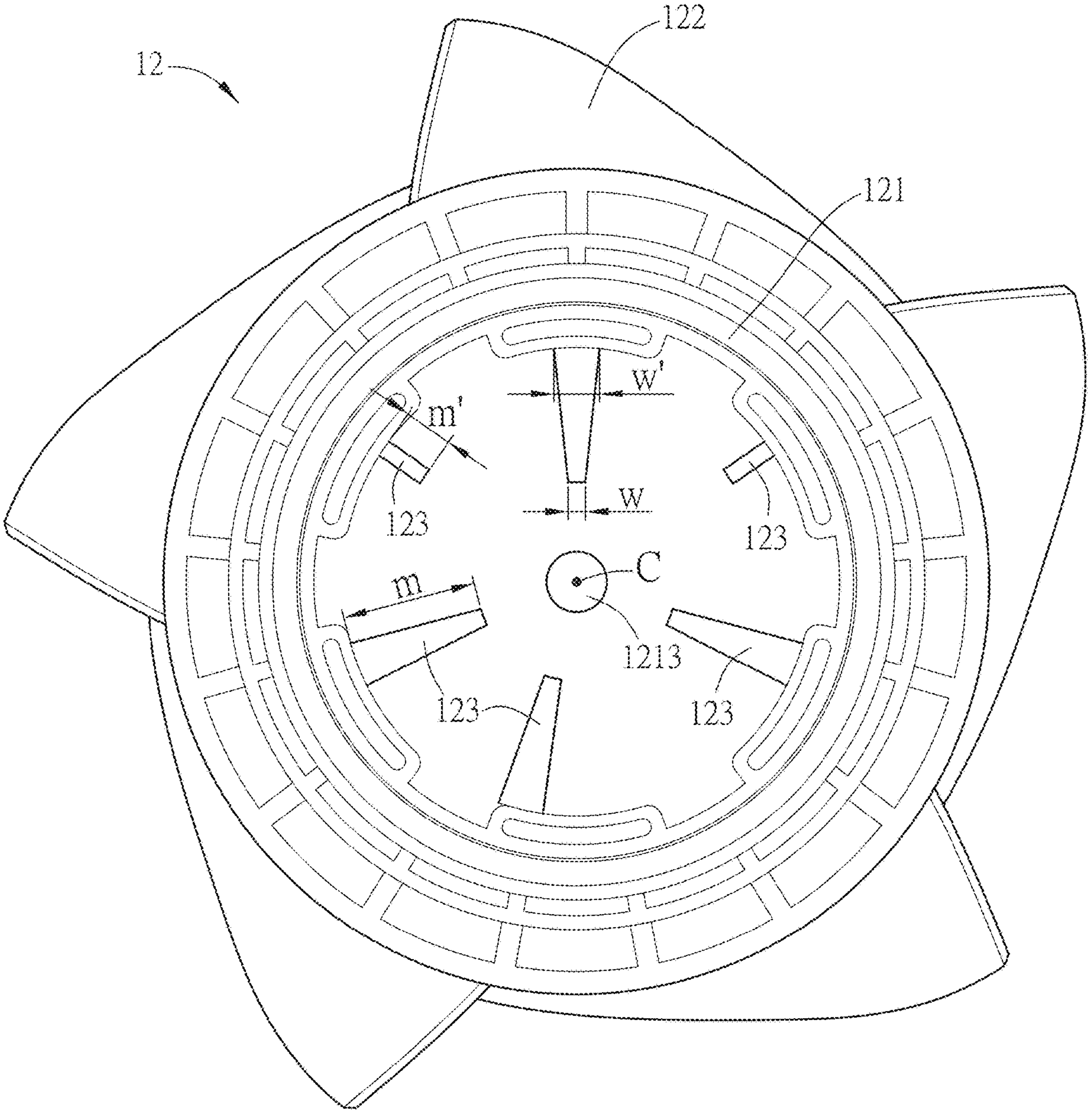
FIG. 5D is a schematic diagram showing another impeller of the fan according to another embodiment of this disclosure.

Referring to FIGS. 5A to 5D in view of FIG. 4, the air-guiding plates 123 may have the same or different lengths m, thicknesses w, heights h, or shapes. As shown in FIG. 5A, the lengths m, thicknesses w, heights h, or shapes of the air-guiding plates 123 are the same. As shown in FIG. 5B, the air-guiding plates 123 have different length m and length m'. As shown in FIG. 5C, the air-guiding plates 123 have different length m and length m', different thickness w and thickness w', and different shapes. As shown in FIG. 5D, the air-guiding plates 123 have different length m and length m', different thickness w and thickness w', and different shapes, and the air-guiding plates 123 are separately arranged with inequivalent interval angles. Of course, the air-guiding plates 123 may have different heights h (not shown). In particular, the interval angles, lengths m, thicknesses w, heights h or shapes of the air-guiding plates 123 can be modified based on the actual requirement of the user, and this disclosure is not limited thereto. In this embodiment, the air-guiding plates 123 are configured for guiding the airflow from the air vent 1213 to the opening 13221 disposed on the top surface of the magnetic conductive housing 1322, thereby enhancing the heat dissipation efficiency of the fan itself and dissipating the waste heat out of the motor by the airflow.

Figure 6:
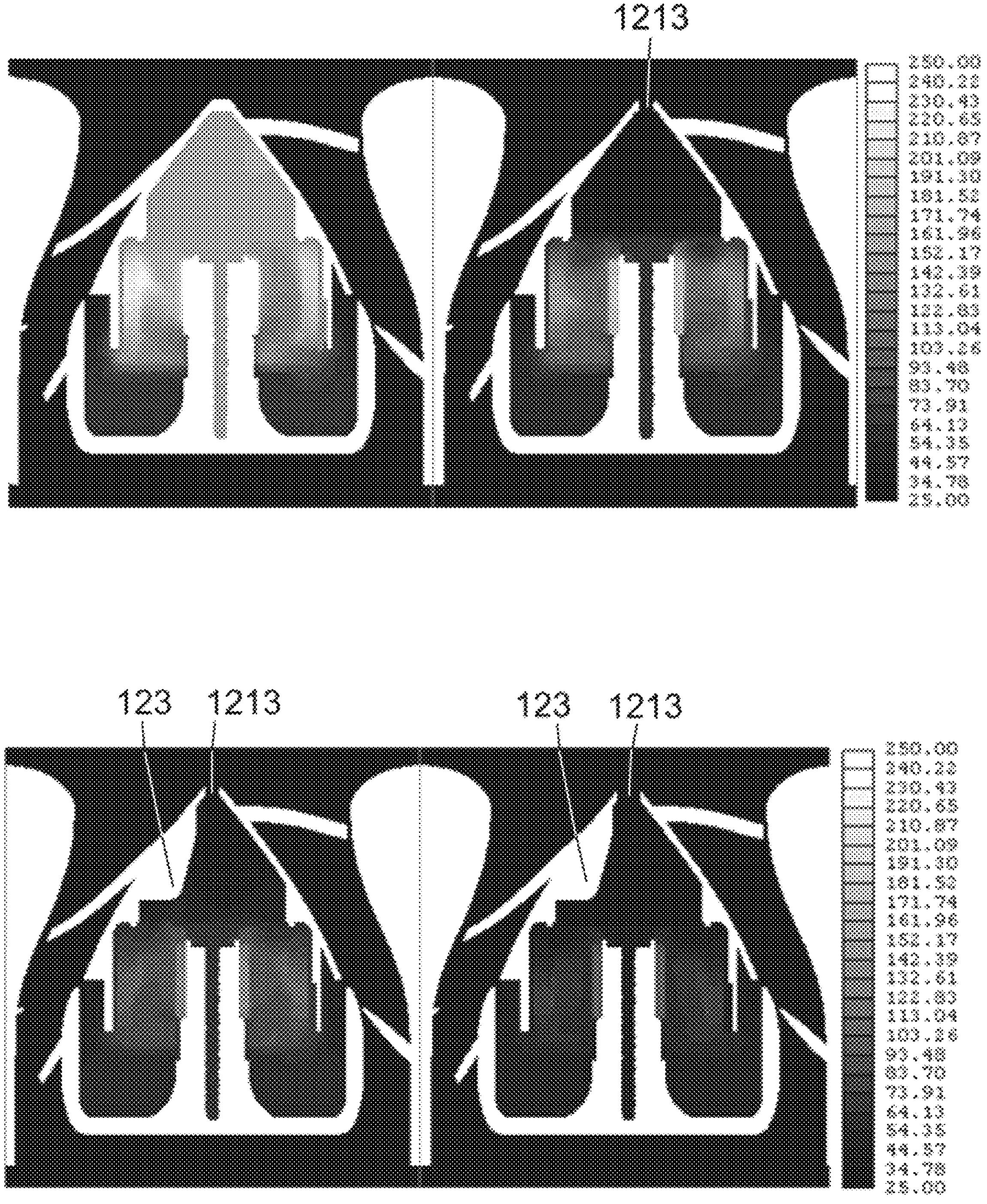
FIG. 6 is a schematic graph showing the temperature distribution of the fans of different embodiments of this disclosure.

FIG. 6 is a schematic graph showing the temperature distribution of the fans of different embodiments of this disclosure. Referring to FIG. 6 in view of FIG. 2, in this embodiment, the results of the heat dissipation efficiencies provided by four 92 mm×95 mm mixed flow fans (17500 RPM, 240 W) are obtained. The results of the first fan (left-top of FIG. 6) and the second fan (right-top of FIG. 6) are used as the blanks data. In the first fan, the hub 121 is not configured with the air vent 1213 and the air-guiding plates 123, and the internal temperature thereof is 247° C. (at the position of the motor 13 as shown in FIG. 2). In the second fan, an air vent 1213 with a size of 3 mm is configured on the hub 121, and the hub 121 is not configured with the air-guiding plates 123. The internal temperature of the second fan is 179° C. (at the position of the motor 13 as shown in FIG. 2). In the third fan (left-bottom of FIG. 6), an air vent 1213 with a size of 3 mm is configured on the hub 121, and the hub 121 is configured with the air-guiding plates 123. The internal temperature of the third fan is 135° C. (at the position of the motor 13 as shown in FIG. 2). In the fourth fan (right-bottom of FIG. 6), an air vent 1213 with a size of 5 mm is configured on the hub 121, and the hub 121 is configured with the air-guiding plates 123. The internal temperature of the fourth fan is 99° C. (at the position of the motor 13 as shown in FIG. 2). In more detailed, in the fan of this disclosure, the hub 121 is configured with an air vent

1213, and the inner periphery of hub 121 is configured with air-guiding plates 123. This design can effectively decrease the inner temperature of the fan. In addition, the heat dissipation efficiency of the fan itself can be further enhanced by increasing the size of the air vent 1213.

In summary, the fan 1 of this disclosure comprises at least one air vent 1213 disposed on the hub 121, a plurality of air-guiding plates 123 disposed on the inner periphery of the hub 121, and at least one opening 13221 disposed on the top surface of the magnetic conductive housing 1322. The air vent 1213 and the opening 13221 are through holes, so that the air flow can pass therethrough. Accordingly, the air flow can be guided from the hub 121 to the motor 13 through the opening 13221, thereby carrying the waste heat generated by the motor 13 away the fan 1. In addition, the heat dissipation efficiency of the fan 1 itself can be enhanced by configuring different sizes, scales or shapes of the air-guiding plates 123. Moreover, the distance d between the top portion 1111 of the base 111 of the frame 11 and the bottom portion 1212 of the hub 121 is configured for further exchanging the hot air flow inside the motor and the outside air flow, thereby further enhancing the heat dissipation efficiency of the fan 1 itself.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A fan, comprising:

a frame;

an impeller, comprising:

a hub having a tapered shape, wherein a width of the hub gradually increases along a direction from a top portion of the hub to a bottom portion of the hub, and the hub has at least an air vent, a plurality of blades disposed around an outer periphery of the hub, and a plurality of first air-guiding plates and a plurality of second air-guiding plates disposed around an inner periphery of the hub and connected directly to the inner periphery of the hub, wherein the plurality of the first air-guiding plates are arranged between two of the plurality of second air-guiding plates in staggered formation, the plurality of the second air-guiding plates are arranged between two of the plurality of first air-guiding plates in staggered formation, the plurality of first air-guiding plates and the plurality of second air-guiding plates have different thicknesses, heights or shapes, each of the first air-guiding plates and the second air-guiding plates is disposed along a direction extending from the inner periphery of the hub to a central axis of the hub, the direction is perpendicular to the inner periphery of the hub; and a motor disposed in the frame, wherein the motor connects to and rotates the impeller, and the motor comprises:

a stator structure, and a rotor structure comprising a shaft, a magnetic conductive housing, and a magnetic element, wherein one end of the shaft connects to the magnetic conductive housing, the magnetic element is disposed around an inner periphery of the magnetic conductive housing and located corresponding to the stator structure, and a top surface of the magnetic conductive housing has at least an opening.

2. The fan according to claim 1, wherein the inner periphery of the frame is configured with a first narrowing area and a second expanding area sequentially from an air inlet side of the fan to an air outlet side of the fan, a largest curvature of the first narrowing area is larger than a largest curvature of the second expanding area, a cross-sectional area of the inner periphery of a top end of the frame at the air inlet side of the fan is larger than a cross-sectional area of the inner periphery of any other portion of the frame.

3. The fan according to claim 1, wherein the air vent is disposed in the top portion of the hub.

4. The fan according to claim 1, wherein the air vent is disposed between a top end of the hub and front edges of the blades contacting the surface of the outer periphery of the hub.

5. The fan according to claim 1, wherein a ratio of a height of each of the first air-guiding plates and the second air-guiding plates to a distance from the top portion of the hub to the bottom portion of the hub ranges from 0.3 to 1.2.

6. The fan according to claim 1, wherein a ratio of a length of each of the first air-guiding plates and the second air-guiding plates to a diameter of the magnetic conductive housing ranges from 0.1 to 0.9.

7. The fan according to claim 1, wherein each of the first air-guiding plates has a rib shape and each of the second air-guiding plates has a wing shape.

8. The fan according to claim 1, wherein the first air-guiding plates and the second air-guiding plates are arranged with equal interval angles.

9. The fan according to claim 1, wherein the first air-guiding plates and the second air-guiding plates are arranged with unequal interval angles.

10. The fan according to claim 1, wherein the inner periphery of the frame is configured with an air-guiding curved surface disposed at the air inlet side of the fan.

11. The fan according to claim 1, wherein top ends of the plurality of the first air-guiding plates and the plurality of the second air-guiding plates at the air vent are higher than a junction of the front edge of one of the blades and the surface of the outer periphery of the hub.

12. The fan according to claim 1, wherein the plurality of the first air-guiding plates and the plurality of the second air-guiding plates have different lengths, thicknesses and shapes.

* * * * *